(12) United States Patent
Grein et al.

(10) Patent No.: US 8,818,150 B2
(45) Date of Patent: Aug. 26, 2014

(54) METHOD AND APPARATUS FOR MODULATION USING A CONDUCTIVE WAVEGUIDE

(75) Inventors: Matthew E. Grein, Cambridge, MA (US); Theodore M. Lyszczarz, Concord, MA (US); Michael W. Geis, Acton, MA (US); Steven J. Spector, Arlington, MA (US); Donna M. Lennon, Bedford, MA (US); Yoon Jung, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1459 days.

(21) Appl. No.: 11/731,338

(22) Filed: Mar. 30, 2007

(65) Prior Publication Data

US 2007/0237443 A1    Oct. 11, 2007

Related U.S. Application Data

(60) Provisional application No. 60/788,537, filed on Mar. 31, 2006.

(51) Int. Cl.
*G02B 6/26* (2006.01)

(52) U.S. Cl.
USPC ............................................. 385/40; 359/245

(58) Field of Classification Search
USPC ........ 385/122, 8, 2, 14, 40, 129–131; 438/22; 359/245
See application file for complete search history.

(56) References Cited

U.S. PATENT DOCUMENTS

| | | | | |
|---|---|---|---|---|
| 3,589,794 A | * | 6/1971 | Marcatili | 385/42 |
| 4,789,212 A | * | 12/1988 | Bristow et al. | 385/11 |
| 4,857,973 A | * | 8/1989 | Yang et al. | 257/73 |
| 4,958,898 A | | 9/1990 | Friedman et al. | |
| 5,056,883 A | * | 10/1991 | Diemeer et al. | 385/8 |
| 5,151,957 A | * | 9/1992 | Riviere | 385/41 |
| 5,293,436 A | * | 3/1994 | Diemeer | 385/11 |
| 5,400,417 A | * | 3/1995 | Allie et al. | 385/2 |
| 5,581,345 A | * | 12/1996 | Oki et al. | 356/4.01 |
| 5,661,830 A | * | 8/1997 | Nishimoto | 385/40 |
| 5,974,216 A | * | 10/1999 | Nakaya | 385/140 |
| 6,169,825 B1 | * | 1/2001 | Morey et al. | 385/11 |
| 6,597,721 B1 | * | 7/2003 | Hutchinson et al. | 372/98 |
| 6,714,768 B2 | * | 3/2004 | Lempkowski | 455/101 |
| 6,748,125 B2 | * | 6/2004 | Deliwala | 385/2 |
| 6,823,112 B2 | * | 11/2004 | Deliwala | 385/37 |
| 6,975,798 B2 | * | 12/2005 | Blauvelt et al. | 385/50 |
| 6,987,910 B2 | * | 1/2006 | Shappir et al. | 385/37 |
| 7,200,308 B2 | * | 4/2007 | Hochberg et al. | 385/122 |

(Continued)

FOREIGN PATENT DOCUMENTS

WO    WO-2004/088394    10/2004

OTHER PUBLICATIONS

Lee et al. (Non-Patent Literature: "Effect of size and roughness on light transmission in a Si/SiO2 waveguide," Applied Physics Letters, vol. 7, No. 11, pp. 1617-1619.).*

(Continued)

*Primary Examiner* — Peter Radkowski
(74) *Attorney, Agent, or Firm* — Goodwin Procter LLP

(57) ABSTRACT

Method and apparatus for modulation of both the intensity and the polarization of radiation in silicon waveguides by applying a biasing voltage to the waveguide.

18 Claims, 6 Drawing Sheets

(56) References Cited

U.S. PATENT DOCUMENTS

| | | | |
|---|---|---|---|
| 7,424,192 B2* | 9/2008 | Hochberg et al. | 385/122 |
| 7,528,403 B1* | 5/2009 | Borselli et al. | 257/25 |
| 7,613,369 B2* | 11/2009 | Witzens et al. | 385/14 |
| 7,653,106 B2* | 1/2010 | Arimoto | 372/46.011 |
| 2003/0013304 A1* | 1/2003 | Deliwala | 438/689 |
| 2003/0031394 A1 | 2/2003 | Deliwala | |
| 2003/0032286 A1* | 2/2003 | Deliwala et al. | 438/689 |
| 2003/0081924 A1* | 5/2003 | Yegnanarayanan et al. | 385/132 |
| 2003/0142943 A1 | 7/2003 | Yegnanarayanan et al. | |
| 2003/0185505 A1* | 10/2003 | Weisberg et al. | 385/28 |
| 2004/0013379 A1* | 1/2004 | Johnson et al. | 385/125 |
| 2004/0052467 A1* | 3/2004 | Blauvelt et al. | 385/50 |
| 2004/0114847 A1* | 6/2004 | Fischer et al. | 385/5 |
| 2004/0126072 A1* | 7/2004 | Hoon Lee et al. | 385/122 |
| 2004/0208454 A1* | 10/2004 | Montgomery et al. | 385/50 |
| 2005/0040410 A1* | 2/2005 | Ledentsov et al. | 257/79 |
| 2005/0089257 A1 | 4/2005 | Barrios et al. | |
| 2005/0094957 A1* | 5/2005 | Takahashi | 385/129 |
| 2005/0214989 A1* | 9/2005 | Keyser | 438/155 |
| 2005/0220405 A1* | 10/2005 | Shappir et al. | 385/37 |
| 2005/0239295 A1 | 10/2005 | Wang et al. | |
| 2005/0271325 A1* | 12/2005 | Anderson et al. | 385/40 |
| 2007/0237443 A1* | 10/2007 | Geis et al. | 385/2 |
| 2008/0073225 A1* | 3/2008 | Paulus | 205/792 |
| 2008/0151349 A1* | 6/2008 | Hochberg et al. | 359/258 |
| 2009/0022445 A1* | 1/2009 | Hochberg et al. | 385/3 |

OTHER PUBLICATIONS

T. Baehr-Jones, M. Hochberg, and A. Scherer, "Photodetection in silicon beyond the band edge with surface states," Opt. Express 16, 1659-1668 (2008).*

Borselli et al. "Measuring the role of surface chemistry in silicon microphotonics," arXiv:physics/0512040v1, 2005.*

Hochberg et al. "Terahertz all-optical modulation in a silicon-polymer hybrid system," Nature Materials 5, 703-709 (2006).*

Darabi et al. "Optical modulation by surface states," 2003 Semicond. Sci. Technol. 18 60.*

Hirabayashi, "Electrically Controllable Liquid-Crystal Rotatable Wave Plate with Variable Phase Retardation" Applied Optics, vol. 44, No. 17, Jun. 10, 2005.

Hirabayashi et al., "Feed-Forward Continuous and Complete Polarization Control with a PLZT Rotatable-Variable Waveplate and Inline Polarimeter" Journal of Lightwave Technology, vol. 21, No. 9, Sep. 2003.

C.K. Madsen, et al. "Reset-Free Integrated Polarization Controller Using Phase Shifters" IEEE Journal of Selected Topics in Quantum Electronics, vol. 11, No. 2, Mar./Apr. 2005.

Mehrany et al. "Novel Optical Slow Wave Structure and Surface Electromagnetic Wave Coupler with Conducting Interfaces" Institute of Physics Publishing, Semicond. Sci. Technol. 19 (2004) 890-896.

Zhou et al. "Polarization Controllable and Monolithically Integrable Optical Waveguide Devices" U.S. Army Research Laboratory, 410/ SPIE vol. 3491.

International Search Report for corresponding International Application No. PCT/US2007/007910, mailed Jun. 4, 2008, 4 pages.

Written Opinion for corresponding International Application No. PCT/US2007/007910, mailed Jun. 4, 2008, 6 pages.

* cited by examiner

METHOD AND APPARATUS FOR MODULATION USING A CONDUCTIVE WAVEGUIDE

STATEMENT REGARDING FEDERALLY SPONSORED RESEARCH

Work described herein was supported by Air Force Contract No. FA8721-05-C-0002, sponsored by the Defense Advanced Research Projects Agency. The Government has certain rights in the invention.

CROSS-REFERENCE TO RELATED APPLICATIONS

The present application claims the benefit of U.S. provisional application No. 60/788,537, filed on Mar. 31, 2006, the entire disclosure of which is incorporated by reference as if set forth in its entirety herein.

FIELD OF THE INVENTION

The present invention relates to a method and apparatus for modulation using a conductive waveguide, and in particular to the electrical biasing of the waveguide to achieve intensity or polarization modulation.

BACKGROUND OF THE INVENTION

Previously, most optical waveguides were typically fabricated of insulating materials such as $Si_3N_4$ or $SiO_2$. With the development of silicon-on-insulator (SOI) technology, silicon waveguides on $SiO_2$ have become practical for transporting micrometer-wavelength radiation. Since these waveguides may be doped and made conductive without inducing excessive optical loss in transmitted signals, a variety of electrooptic devices have been made utilizing SOI technology that could not be realized with insulating waveguides. To date, these devices have typically utilized external means for intensity and polarization control and modulation. Furthermore, these waveguides typically exhibit optical loss from light being scattered out of the waveguide and being absorbed by chemicals at the silicon waveguide surface.

Accordingly, there is a need for methods and apparatus utilizing these technologies that do not require external means for polarization control and modulation and a low power means of modulating and reducing optical loss.

SUMMARY OF THE INVENTION

Embodiments of the present invention provide a method and apparatus in which a biasing voltage is applied to a silicon waveguide to provide a CMOS-compatible modulator which can serve, for example, as a polarization element, a low-power, low-frequency optical modulator, or as a means for controlling optical loss in silicon waveguides.

In one aspect, embodiments of the present invention provide an apparatus comprising an insulating substrate, a first conductive electrode, and a first conductive waveguide formed on an insulating layer in contact with a surface of the substrate and electrically connected to the electrode. A voltage is applied between the substrate and the electrode to bias the waveguide and thereby modulate radiation in the waveguide.

In one embodiment, the apparatus also includes a second grounded electrode which is electrically connected to a third conductive electrode or a second conductive waveguide. In another embodiment, the substrate is a silicon substrate. In some embodiments, the waveguide is a silicon channel formed on a silicon dioxide layer. The substrate may be grounded. The waveguide can be hydrophilic or coated with a polymer containing an acid group or coated with a spin-on glass. The applied voltage may vary with time.

In another aspect, embodiments of the present invention provide a method for control of radiation in a waveguide including providing an insulating substrate, providing a first conductive electrode, providing a first conductive waveguide formed on an insulating layer in contact with a surface of the substrate and electrically connected to the electrode. A voltage is applied between the electrode and the substrate to bias the waveguide and thereby modulate radiation in the waveguide.

In one embodiment, the method further includes providing a second grounded electrode which is electrically connected to a third conductive electrode or a second conductive waveguide. The substrate may be a silicon substrate and in some embodiments the substrate may be grounded. In some embodiments, the waveguide is a silicon channel formed on a silicon dioxide layer. In other embodiments, the waveguide may be hydrophilic, may be coated with a polymer containing an acid group, or coated with a spin-on glass. The applied voltage may vary with time.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

Figure 1A:
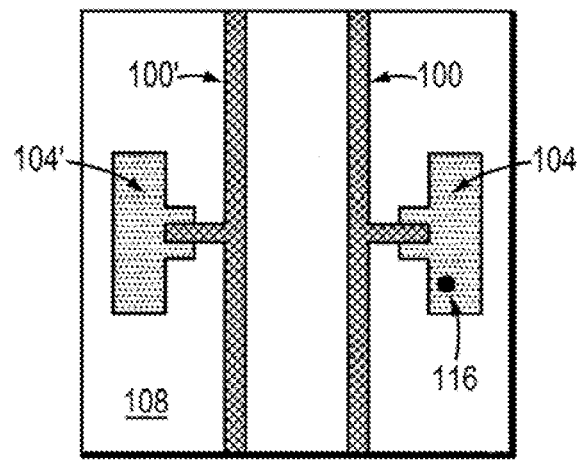
FIG. 1(a) is an overhead view of an embodiment of the present invention.
Figure 1B:
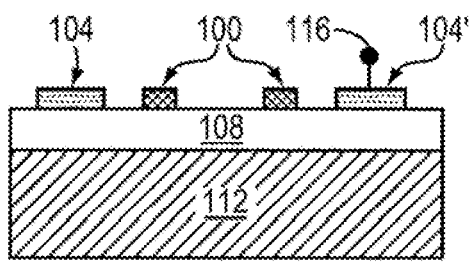
FIG. 1(b) is a cross section view of the embodiment of FIG. 1(a)

Referring to FIG. 1(a) and FIG. 1(b), one embodiment of the present invention consists of at least one waveguide—two waveguides 100, 100' as depicted—implemented using SOI technology. Each waveguide 100, 100' consists of a Si channel on an SOI substrate, such as $SiO_2$ 108. Each waveguide 100, 100' is in turn electrically connected to a conductive electrode, such as an aluminum contact 104, 104'. The SOI substrate 108 is typically formed in contact with a Si substrate 112. One of the waveguides 100, 100' may act as an adjacent electrode modifying the optical properties of the other waveguide.

In one embodiment, the Si waveguide can be approximately 0.8 µm wide and 0.2 µm thick on a 3 µm of layer $SiO_2$, and the conductive adjacent waveguide is spaced approximately 50 µm away. In this embodiment, the waveguides 100, 100', having an active length of 0.65 cm, may be doped to a level of $5 \times 10^{18}$ boron for 2 µm on either side of the Al contacts 104, 104' and otherwise be undoped.

In operation, one contact is biased and another contact acts as a grounded counter electrode. This other contact may be a second conductive contact, the adjacent waveguide, or the Si substrate 112 itself. This applied voltage 116 biases the Si material in the waveguide and causes the intensity and polarization modulation effects described in more detail below.

Figure 2:
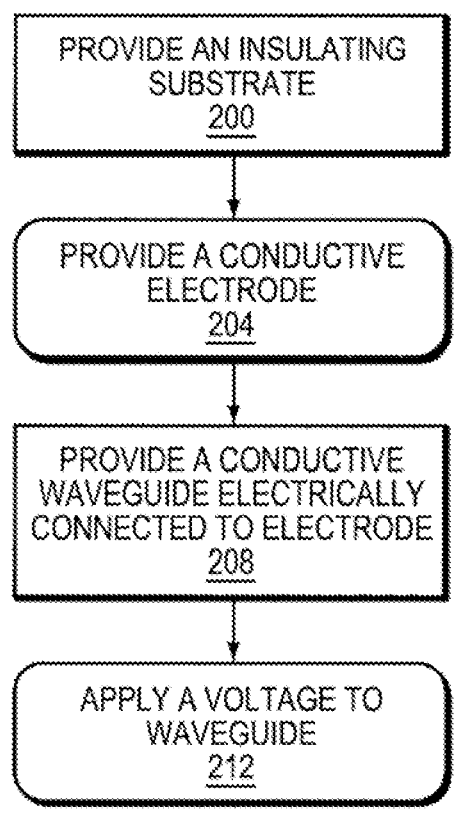
FIG. 2 is a flowchart indicating the steps of a method in accord with one embodiment of the present invention.

Referring to FIG. 2, the steps involved in a method embodiment of the present invention are shown. First, an insulating substrate, such as a Si substrate, is provided (STEP 200). Then, a conductive electrode, such as an Al contact, (STEP 204) and a waveguide, such as an Si channel on an $SiO_2$ substrate, which is electrically connected to the electrode (STEP 208) are provided. Finally, a voltage is applied to the waveguide (STEP 212) using, e.g., the electrode and the substrate or two electrodes in proximity to the waveguide.

Figure 3:
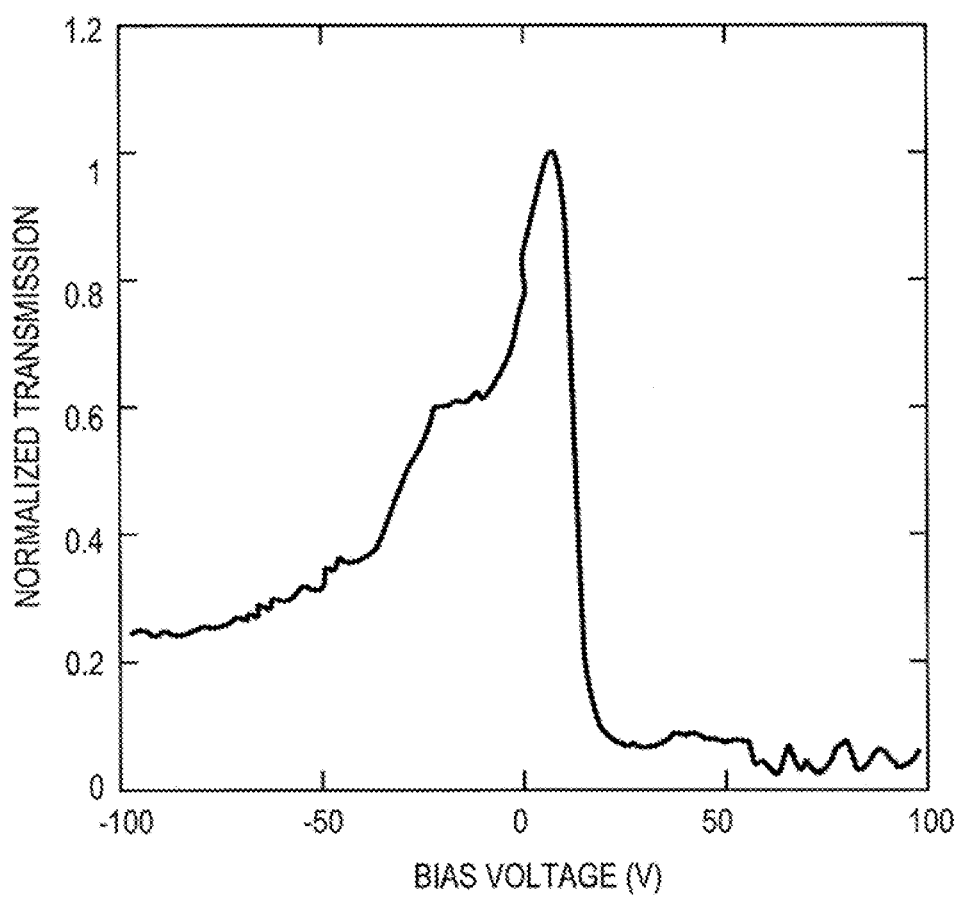
FIG. 3 depicts normalized transmission through a biased waveguide as a function of bias voltage.

Referring to FIG. 3, as a waveguide is biased, the absorption and the effective index of the waveguide changes. It is believed at this time that the electrical field across the $SiO_2$ surface is responsible for the change in absorption. FIG. 3 shows normalized transmission through a biased waveguide as a function of bias voltage, with normalized transmission peaking at a slightly positive bias voltage, showing that the bias reduces optical loss in the waveguide compared to a waveguide without electrodes and biasing. At this time, the oscillations in transmission between 50 and 100 V are believed to be due to the effective index of the waveguide changing with bias voltage.

Figure 4:
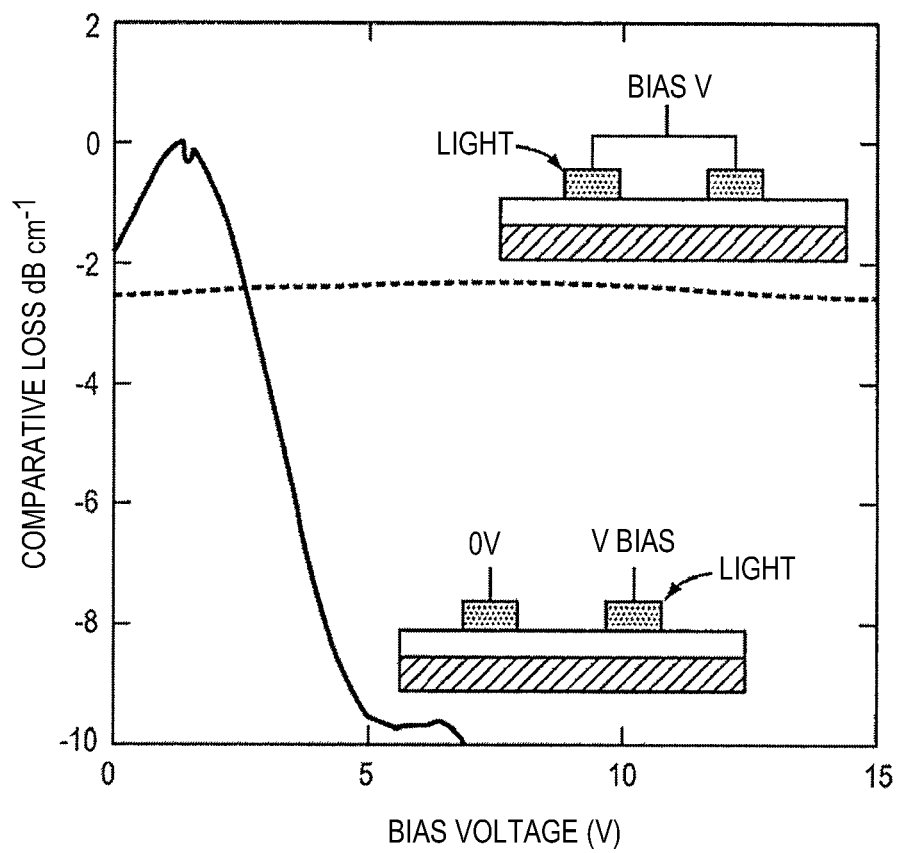
FIG. 4 depicts optical loss in a silicon waveguide as a function of bias voltage for two bias conditions.

FIG. 4 depicts an embodiment of the invention having two waveguides, biased both differentially and then at the same voltage. FIG. 4 shows optical loss in a silicon waveguide as a function of bias voltage for these two bias conditions. The solid curve illustrates the case where the waveguides are biased differentially, whereas the finely dashed curve is for the case when both waveguides are biased at the same voltage. The insets in the figure show the two bias conditions. The optical loss results illustrate that the application of a differential bias voltage is typically more effective at inducing modulation than when both waveguides are biased at the same voltage.

When both the waveguide and the adjacent electrode are biased to the same potential with respect to the substrate, only a small variation in absorption is observed, which at this time is believed to be consistent with free carriers in the waveguide associated with the electric field between the waveguide and the grounded Si substrate.

Current Theory of Operation

Figure 5:
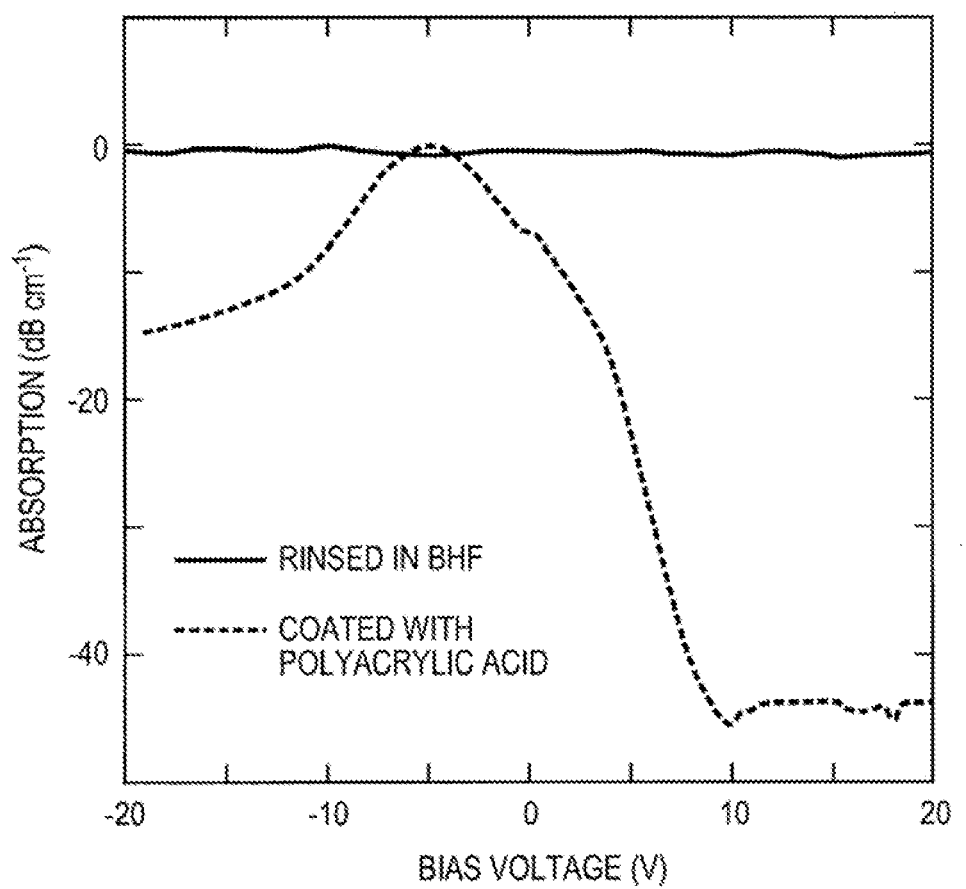
FIG. 5 depicts absorption of a grounded waveguide with the adjacent waveguide biased.

Referring to FIG. 5, modulation is significantly reduced when conducted in dry $N_2$ instead of laboratory air, which is believed to suggest at this time that adsorbed water vapor is responsible for the variation in transmission with waveguide bias. Moreover, if the waveguides are made to be hydrophobic by rinsing them in buffered hydrofluoric acid ("BHF"), the bias voltage causes little modulation of the transmitted light, which again is believed to suggest at this time that adsorbed water vapor is responsible for modulation effects.

FIG. 5 illustrates the extremes of adsorption on the same waveguides, one rinsed in BHF and the other coated with a polymer containing an acid group. The curve that is constant at 0 dB cm$^{-1}$ illustrates the results obtained after rinsing the waveguide in BHF for two seconds. A similar curve would also be obtained if the waveguide is operated in an atmosphere of dry $N_2$. The curve that starts in the negative dB cm$^{-1}$ range illustrates the results obtained when coating the waveguide with 0.5 µm of polyacrylic acid. A similar curve would also be obtained by coating the waveguide with an ion conductive Li-doped spin-on glass.

Since making the waveguide hydrophobic removes the variation of transmission with bias voltage, and the transmission is consistently less than the maximum transmission obtained in the hydrophilic case, it is believed at this time that one component of the modulation effect derives from surface state modification. As shown, coating the waveguide with a polymer containing an acid group reduces the effect of atmospheric humidity on the adsorption, while depriving the adjacent atmosphere entirely of water vapor or rendering the wafer hydrophobic almost completely eliminates absorption from the applied bias voltage, which would be consistent with the belief at this time that adsorption and surface state modifications are responsible for modulation effects in the waveguide.

Figure 6:
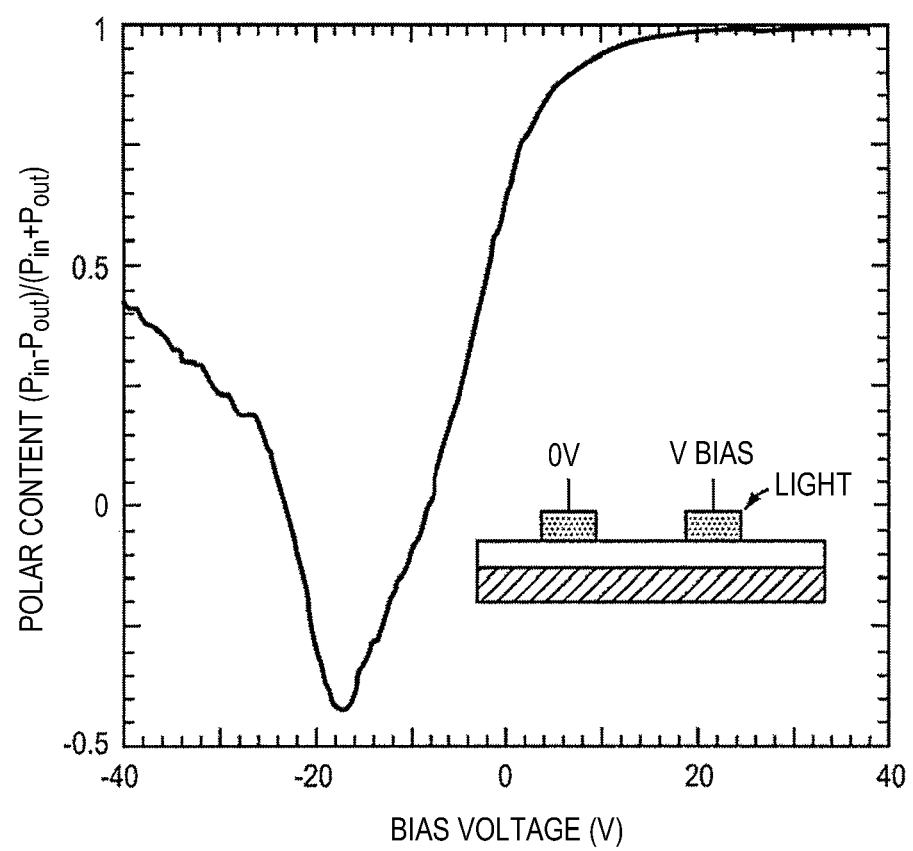
FIG. 6 depicts polarization of transmitted light as a function of bias voltage.

FIG. 6 illustrates another embodiment of the invention having two waveguides, in this case differentially biased. Since, under a differential bias, the electric field only appears on one side of the waveguide, biasing here will cause an optical asymmetry. FIG. 6 shows the rotation of the polarization of transmitted light with the magnitude of the applied bias voltage. Here the adjacent waveguide was initially biased to 40 V and the polarization of the input light was adjusted so the electric field of the output light was in the plane of the substrate. The bias voltage was then swept from 40 to −40V and the polarization was measured. An ambient of dry $N_2$ removes any variation of polarization with bias voltage.

In short, the foregoing demonstrates that it is possible to modulate both intensity and polarization of micrometer length optical radiation in silicon waveguides by applying a voltage to a conductive waveguide utilizing an adjacent electrode, an adjacent waveguide, or a silicon substrate. The modulation effect is believed at this time to be the result of both the adsorption of chemicals like water to the waveguide surface and the modification of surface states on the waveguide. Attachment of different functional groups to the silicon surface and humidity in the environment modifies the modulation of intensity and polarization with bias.

It will therefore be seen that the foregoing represents a highly advantageous approach to providing a CMOS-compatible, voltage-controlled polarization element, suitable for applications such as a low-frequency, low-power optical modulator, or an element for controlling optical loss in silicon waveguides.

The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A discrete polarization element suitable for use in integrated circuits, the polarization element comprising:
    an insulating substrate;
    a first conductive electrode; and
    a first conductive waveguide formed on an insulating layer in contact with a surface of the substrate and electrically connected to the electrode, whereby a voltage applied between the substrate and the electrode modulates the polarization of optical radiation in the waveguide.

2. The polarization element of claim 1 further comprising a second grounded electrode which is electrically connected to a third conductive electrode or a second conductive waveguide.

3. The polarization element of claim 1 wherein the substrate is a silicon substrate.

4. The polarization element of claim 1, wherein the waveguide is a silicon channel formed on a silicon dioxide layer.

5. The polarization element of claim 1, wherein the substrate is grounded.

6. The polarization element of claim 1, wherein the waveguide is hydrophilic.

7. The polarization element of claim 1, wherein the waveguide is coated with a polymer containing an acid group.

8. The polarization element of claim 1, wherein the waveguide is coated with a spin-on glass.

9. The polarization element of claim 1, wherein the applied voltage varies with time.

10. A method suitable for use in integrated circuits for polarization control in a waveguide, the method comprising:
   providing an insulating substrate;
   providing a first conductive electrode;
   providing a first conductive waveguide formed on an insulating layer in contact with a surface of the substrate and electrically connected to the electrode; and
   applying a voltage between the electrode and the substrate to modulate the polarization of optical radiation in the waveguide.

11. The method of claim 10 further comprising providing a second grounded electrode which is electrically connected to a third conductive electrode or a second conductive waveguide.

12. The method of claim 10, wherein the substrate is a silicon substrate.

13. The method of claim 10, wherein the waveguide is a silicon channel formed on a silicon dioxide layer.

14. The method of claim 10, wherein the substrate is grounded.

15. The method of claim 10, wherein the waveguide is hydrophilic.

16. The method of claim 10, wherein the waveguide is coated with a polymer containing an acid group.

17. The method of claim 10, wherein the waveguide is coated with a spin-on glass.

18. The method of claim 10, wherein the applied voltage varies with time.

* * * * *

UNITED STATES PATENT AND TRADEMARK OFFICE
CERTIFICATE OF CORRECTION

| | | |
|---|---|---|
| PATENT NO. | : 8,818,150 B2 | Page 1 of 1 |
| APPLICATION NO. | : 11/731338 | |
| DATED | : August 26, 2014 | |
| INVENTOR(S) | : Michael W. Geis et al. | |

It is certified that error appears in the above-identified patent and that said Letters Patent is hereby corrected as shown below:

In the specification

Please delete the paragraph titled "STATEMENT REGARDING FEDERALLY SPONSORED RESEARCH" encompassing Column 1, lines 5-12:

"Work described herein was supported by Air Force Contract No. FA8721-05-C-0002, sponsored by the Defense Advanced Research Projects Agency. The Government has certain rights in the invention."

and replace with:

"This invention was made with Government support under Contract No. FA8721-05-C-0002 awarded by the U.S. Air Force. The Government has certain rights in the invention."

Signed and Sealed this
Nineteenth Day of April, 2016

Michelle K. Lee
*Director of the United States Patent and Trademark Office*